March 18, 1969 C. W. JONES ETAL 3,433,123
HYDRAULIC DRIVE SYSTEM
Filed Sept. 28, 1967 Sheet 1 of 2
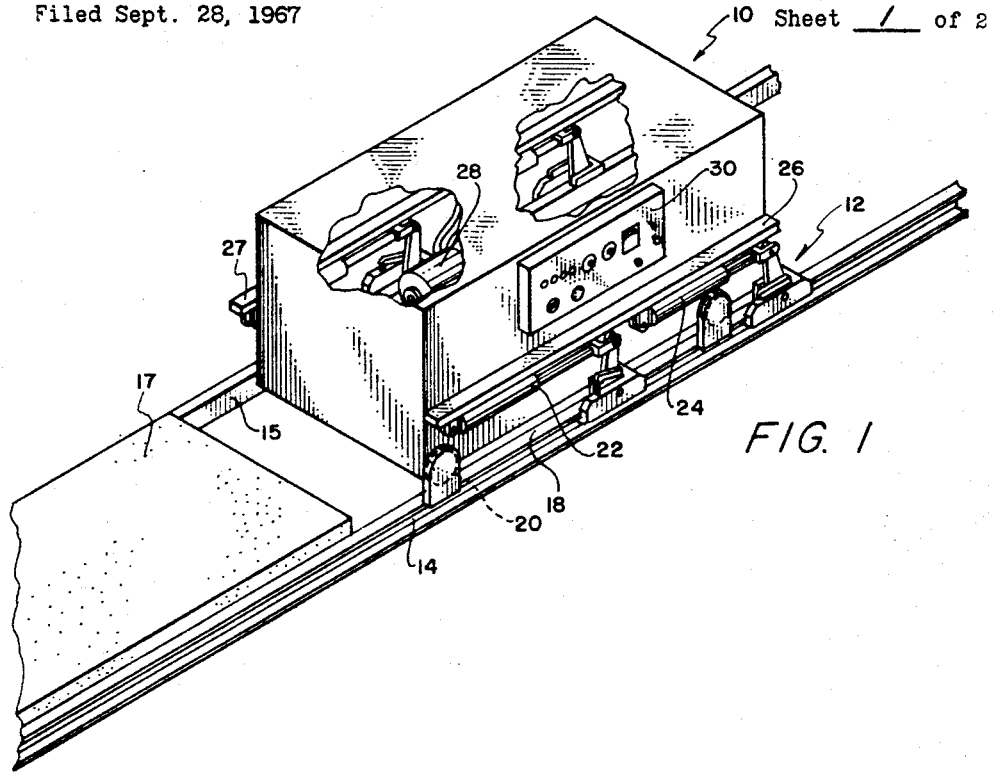
FIG. 1
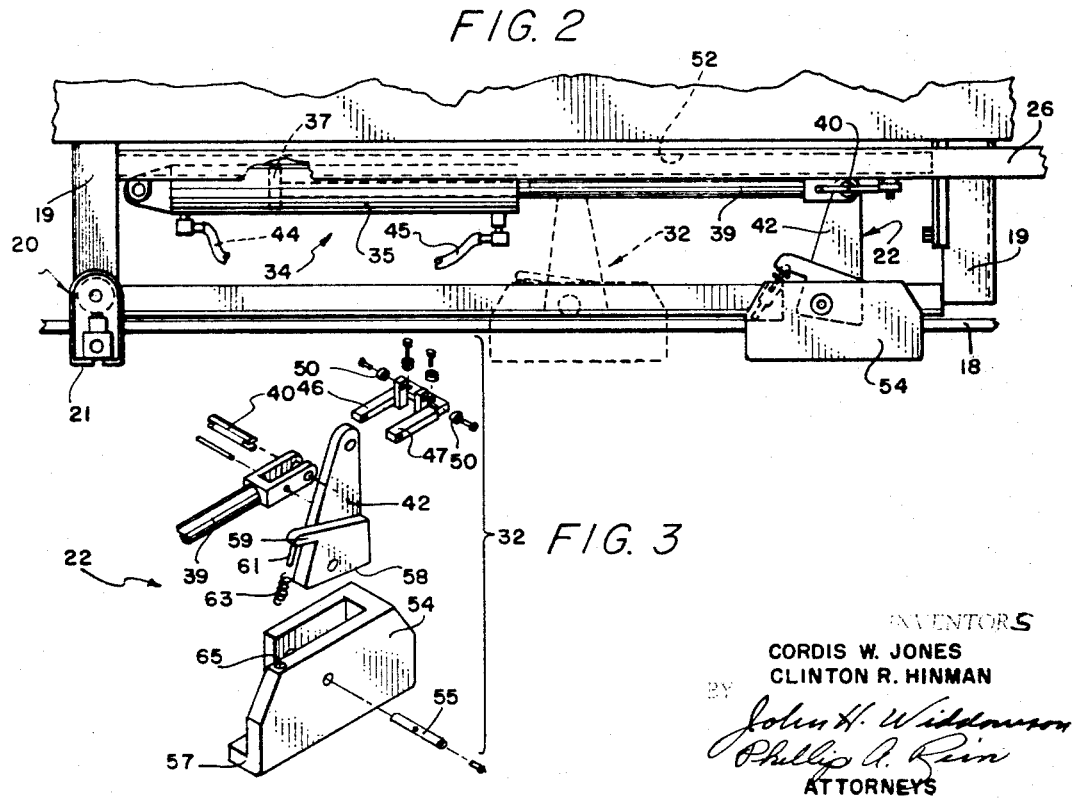
FIG. 2
FIG. 3
INVENTORS
CORDIS W. JONES
CLINTON R. HINMAN
BY John H. Widdowson
Phillip A. Rein
ATTORNEYS

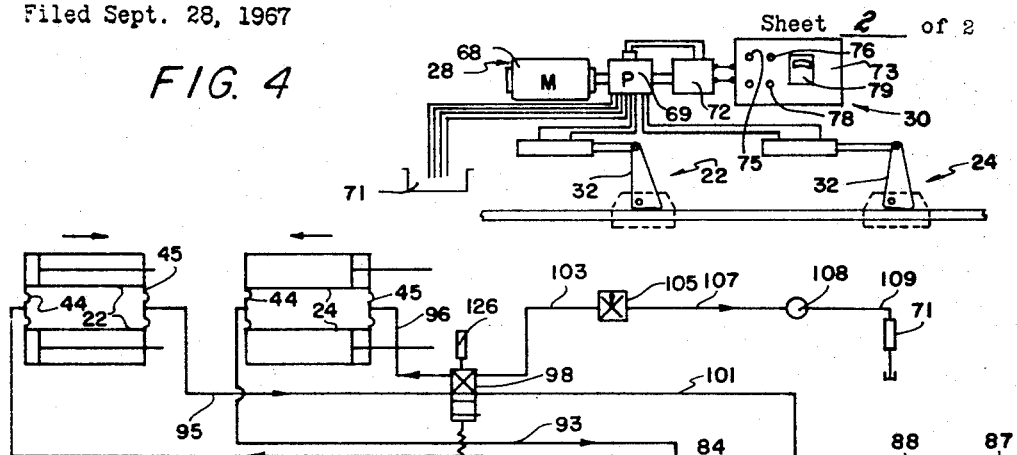
FIG. 4
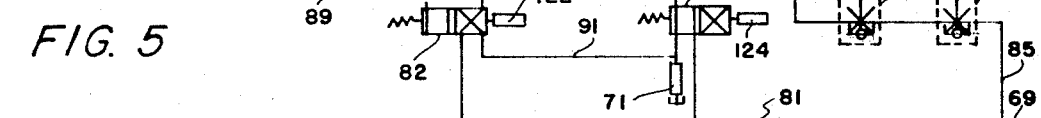
FIG. 5
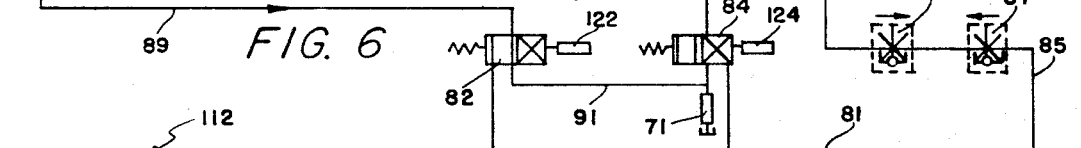
FIG. 6
FIG. 7

3,433,123
HYDRAULIC DRIVE SYSTEM
Cordis W. Jones and Clinton R. Hinman, Salina, Kans., assignors to Hastings Dynamold Corporation, Salina, Kans., a corporation of Nebraska
Filed Sept. 28, 1967, Ser. No. 671,446
U.S. Cl. 91—36                    10 Claims
Int Cl. F15b 21/02, 11/22, 13/07

ABSTRACT OF THE DISCLOSURE

This invention relates to a hydraulic drive system for continuously moving a load for an indefinite distance under fluid pressure at a constant speed, and more particularly, this invention relates to a new and novel hydraulic drive system mountable upon a machine mechanism having cam drive assemblies connectable to guide rails for the continuous, uninterrupted movement therealong at a desired speed. More specifically, this invention relates to a hydraulic drive system having a cooperating pair of hydraulic cam drive assemblies interconnected by a fluid flow control means to supply under fluid pressure successively to the pairs of cam drive assemblies to provide for a continuous positive drive for movement of a machine mechanism along a track structure on movement from extended to retracted positions of the cam drive assemblies thereby providing for continuous and uninterrupted movement.

---

Various types of hydraulic drive apparatus are operable to provide a propulsion means along a given track or carriage assembly, however, the prior art devices are generally limited in direction and are not operable for continuous, uninterrupted travel for an infinite distance. Additionally, the prior art devices fail to provide interconnected hydraulic drive assemblies having piston and cylinder assemblies operable to successively provide propulsion to a given machine or the like without interruption thereof due to reversal of direction of piston travel. Additionally, the prior art hydraulic drive apparatus are generally expensive to manufacture, complicated to operate, unreliable in operation, and fail to provide a continuous, smooth propulsion to a heavy machine mechanism which is desired and required in many manufacturing operations.

In accordance with the present invention, a new hydraulic drive system is provided usable upon a heavy piece of machinery such as a concrete slab machine, a concrete saw cutting mechanism, a machine to lay asphalt, etc., operable to move the same upon a pair of spaced guide rails under hydraulic pressure continuously at a pre-set rate of speed without sporadic interruptions. The hydraulic drive system includes pairs of hydraulic cam drive assemblies, each having one unit positioned on opposite sides of a machine mechanism; a hydraulic control circuit means mounted within the machine mechanism and interconnected to the hydraulic cam drive assemblies for movement along the parallel guide rails; and an electrical control circuit interconnected to the hydraulic control means for the proper sequential operation to move the machine mechanism along the guide rails. More specifically, each hydraulic cam drive assembly includes a piston and cylinder assembly having one end pivotally connected to the machine mechanism and the opposite end operably connected as by a cam drive assembly to a respective adjacent guide rail. The piston and cylinder assembly is provided with an axially movable piston within a cylinder connected as by a piston rod extended laterally therefrom to the cam drive assembly. A pair of fluid pressure lines are connected, respectively, to opposite ends of the cylinder so as to allow the piston therein to be dual acting depending on whether the fluid lines are conveying fluid to or from the cylinder. Each cam drive assembly is provided with a cam shoe having an upper end pivotally connected to the piston rod and a lower shoe housing which, in turn, is slidably mounted upon an outer flange of the respective guide rails for axial movement therealong. The lower end of the cam shoe is pivotally connected to the shoe housing and includes an outer cam surface which is engageable with the flange of the respective guide rail and is held in this position as by a compression spring. Therefore, the cam drive assembly is provided with a cam shoe pivotable in one direction for cam engagement with the guide rail whereupon pressure supplied to the proper end of the piston cylinder assembly operates to extend the cylinder relative to the stationary piston and piston rod for movement of the entire machine mechanism therealong. After reaching an extended position, fluid flow through the fluid lines is reversed whereupon the piston, interconnected piston rod, and cam drive assembly is pulled in the other direction to the retracted position for subsequent actuation in an identical manner for again extending the cylinder, for movement of the machine mechanism. The hydraulic drive means is provided with cooperating pairs of the hydraulic cam drive assemblies whereupon at least one of the aforementioned pairs is in the process of pushing the machine mechanism along the guide rails so that there is an uninterrupted travel thereof. The hydraulic control circuit means includes a motor connected to a fluid hydraulic pump receiving fluid supplied from a reservoir tank; a panel of control solenoids to regulate direction of fluid flow; and an electrical control panel connected to the solenoid control panel having a plurality of dials, knobs, etc., thereon to regulate the speed of operation of the hydraulic cam drive assembly and the direction of movement. More specifically, the hydraulic control means is provided with a plurality of dual acting solenoid control valves interconnected by fluid pressure lines to the opposite ends of the piston and cylinder assemblies of the respective hydraulic cam drive assemblies to control fluid flow thereto. A fluid operated timing motor is provided therein having a rotating cam structure operable to actuate a limit switch for operation of the hydraulic control means as required. Therefore, the timing motor is operably connected to the electrical control circuit which includes a pair of time delay relays operably connected to the solenoid control valves to control operation of fluid flow from the fluid pump to the opposite ends of the piston and cylinder assemblies. The time delay relays are operable for given time periods to control fluid flow by an electrical current flow to the respective solenoid control valve whereby one of the hydraulic cam drive assemblies is always in operation to positively push the machine mechanism forwardly upon the guide rails so that there is never an interruption in this power drive feature.

Accordingly, it is an object of this invention to provide a new and novel hydraulic drive system overcoming the above-mentioned disadvantages of the prior art drive systems.

Another object of this invention is to provide a hydraulic drive system readily mountable on heavy, longitudinally movable machines such as a concrete slab slip former or a sawing and grinding machine to move the same along a longitudinal path upon guide rails in a continuous, uninterrupted movement at a desired preselected speed.

One other object of this invention is to provide a hydraulic drive system having a plurality of cam actuated drive assemblies connected to a machine mechanism to be moved longitudinally along upon a pair of guide rails operable by an electrically controlled hydraulic control means to continuously move the machine mechanism.

Another, still further object of this invention is to provide a hydraulic drive system for propelling a machine mechanism having a plurality of solenoid actuated valves interconnected hydraulically to piston and cylinder assemblies for extension and retraction thereof and an electrical control circuit with a plurality of time delay relays actuated by a hydraulically controlled limit switch to provide for the proper extension and retraction of the piston and cylinder assemblies for continuous, uninterrupted movement of the machine mechanism.

One other object of this invention is to provide a hydraulic drive system having extendable and retractable hydraulic cam drive assemblies operable under a desired fluid pressure whereby the speed of movement of the machine mechanism can readily be controlled so as to be correlated to load conditions.

Still, one further object of this invention is to provide a hydraulic drive system including a new and novel electrical control means having time delay relays operable to actuate solenoid valves regulating hydraulic fluid flow to and from opposite sides of dual acting piston and cylinder assemblies interconnected to a machine mechanism for the movement thereof.

Still another object of this invention is to provide a hydraulic drive system operable to propel a machine mechanism along a given longitudinal path in a continuous uninterrupted manner with such device being relatively economical to manufacture, reliable and efficient in operation, and substantially maintenance-free.

Various other objects, advantages, and features of the invention will become apparent to those skilled in the art from the following discussion, taken in conjunction with the accompanying drawings, in which:

FIG. 1 is a perspective view of a machine mechanism mounted upon parallel guide rails having a hydraulic drive system of this invention connected thereto;

FIG. 2 is a fragmentary side elevational view of one hydraulic cam drive assembly of the hydraulic drive system of this invention illustrating the retracted position in dotted lines;

FIG. 3 is an enlarged exploded prespective view of a cam shoe assembly of the cam drive assembly of the hydraulic drive system of this invention;

FIG. 4 is a schematic diagram of a control panel assembly of the hydraulic drive system of this invention;

FIGS. 5 and 6 are schematic diagrams of a hydraulic control means of the hydraulic drive system of this invention; and FIG. 7 is an electrical schematic of the hydraulic drive system of this invention.

The following is a description of preferred specific embodiments of the new hydraulic drive system of this invention, such being made with reference to the drawings, whereupon the same reference numerals are used to indicate similar parts and/or structures. It is understood that such discussions and descriptions are not to unduly limit the scope of the invention.

Referring to the drawings in detail, and particularly FIG. 1, a heavy machine mechanism 10 is illustrated as having a hydraulic drive system of this invention, indicated generally at 12, connected thereto. The machine mechanism 12 is shown as mounted on opposed parallel guide rails 14 and 15 for longitudinal movement therealong across, for example, a concrete slab 17 for cutting, cleaning, or other machining operations thereon. The guide rails 14 and 15 are of U shape in transverse cross section supported on one leg having an upper leg 18 adapted to be engaged by the hydraulic drive system 12 as will be explained. As shown in FIG. 2, the machine mechanism 10 is vertically supported by upright beam members 19 through roller assemblies 20 to the upper legs 18 on the guide rail 14 and 15. Each roller assembly 20 merely provides an upper roller 21 having continuous supporting surface contact allowing for the same to be easily rolled and moved along the guide rails 14 and 15. The hydraulic drive system 12 is used to provide an adjustable, continuous uninterrupted hydraulic drive force that may be used on various types of manufactring and heavy constrction machines for the propulsion thereof.

The hydraulic drive system 12 includes pairs of cooperating hydraulic cam drive assemblies 22 and 24 connected to support beams 26 and 27, respectively, on the machine mechanism 10; a hydraulic control means 28 connected to the cam drive assemblies 22 and 24 for sequential actuation thereof; and an electrical control means 30 operably connected to the hydraulic control means 28 for the proper operation thereof as will be explained.

As shown in FIGS. 2 and 3, the cam drive assemblies 22 and 24 are identical, and, therefore, only cam drive assembly 22 need be described in detail. The cam drive assembly 22 includes a cam shoe assembly 32 adapted to engage the respective guide rails 14 and 15 and a piston and cylinder assembly 34 connected thereto. The piston and cylinder assembly 34 includes a hydraulic cylinder 35 having one end pivotally connected to the adjacent support beam 26 and a piston 37 mounted in the cylinder 35 having a piston rod 39 extended therefrom pivotally connected as by pin 40 to an actuator or cam lever 42. Hydraulic fluid lines 44 and 45 are connected to opposite ends of the cylinder 35 to supply and receive fluid therefrom to actuate axial movement of the dual acting piston 37 and the interconnected rod 39 in a conventional manner. The outer and rearward most end of the piston rod 39 is also connected to lugs 46 and 47, and a support block 48 on which are mounted roller bearings 50 slidably mounted within a channel 52 secured to the under side of the adjacent support beam 26. It is seen that the bearings 50 within the channel 52 operate to control axial movement of the piston rod 39 in a substantially horizontal plane so as to assure proper movement thereof when the piston and cylinder assembly 34 is moved from the extended and retracted positions.

As is best shown in FIG. 3, the cam shoe assembly 22 further includes a housing 54 pivotally connected to the lower end of the actuator lever 42 as by a stud shaft 55. The shoe housing 54 is of L-shape in transverse cross section having a base 57 adapted to engage the under surface and edge portion of the leg 18 of the guide rails 14 and 15, respectively. The lower end of the actuator lever 42 has a cam surface 58 engageable with the upper surface of the leg 18 to clamp the same between the surface 58 and the shoe housing 54. The actuator lever 42 is of a substantially triangular shape pivotal about the stud shaft 55 with actuation of the cylinder and piston assembly 34. Additionally, the actuator lever 42 is integrally formed with a forward upwardly inclined projection 59 having a rod 61 adapted to receive one end of a compression spring 63 thereabout. The other end of the compression spring 63 is mounted within a hole 65 in the upper adjacent portion of the shoe housing 54. It is obvious that the compression spring 63 is operable to rotate the actuator lever 42 clockwise, as viewed in FIG. 2, about the stud shaft 55 to engage the cam surface 58 thereof with an upper adjacent surface of the leg 18.

In the use and operation of the cam drive assembly 22, the retracted position is shown in dotted lines in FIG. 2 whereupon fluid under pressure is supplied through line 44 against the piston 37 in the cylinder 35. The piston rod 39 is moved rearwardly to force the actuator lever 42 about the stud shaft 55 to clamp the leg 18 between the cam surface 58 and the shoe housing 54. The fluid pressure now acts to move the cylinder 35 and interconnected machine mechanism 10 forwardly relative to the stationary piston 37 to the fully extended position of FIG. 2. Next, the fluid flow is reversed with the fluid pressure supplied through the line 45 against the piston 37. This pivots the actuator lever 42 counter-clockwise as viewed in FIG. 2, whereby the cam shoe assembly 22 is pulled forwardly to a position adjacent the cylinder 35. The compression spring 63 operated to maintain contact of the actuator lever 42 with the leg 18 to eliminate lost motion during the driving movement thereof. The cam drive assemblies 22 and 24 are similarly operable to propel the machine mechanism 10 with the respective pairs operable sequentially to provide a continuous drive thereof. It is obvious that the forward speed of the machine mechanism 10 is readily controlled by the pressure and quantity of the fluid supplied through the fluid lines 44 and 45 to the cam drive assemblies 22 and 24. The balance of this application is concerned with the electrical and hydraulic means of controlling actuation of the piston and cylinder assemblies 34 and the direction of the fluid flow to and from the cylinders 35 on opposite sides of the piston 37 so as to regulate movement of the machine mechanism 10 along the guide rail 14 and 15.

As shown in FIG. 4, the hydraulic control means 28 includes a drive motor 68 interconnected as by belts in a conventional manner to a hydraulic pump 69 and a reservoir 71 to supply fluid under pressure and a solenoid control panel 72 interconnected to the pump 69 to direct fluid flow in the proper direction. The electrical control means 30 includes a control panel 73 operably connected to the motor 68 and the solenoid control panel 72. The electrical control panel 73 houses the main portion of an electrical circuit means provided with start and stop buttons 75 and 76; pressure indicating gauge 78, a running time meter 79, and other similar control gauges and indicators as required.

More specifically, as shown in FIG. 5, the hydraulic control means 28 includes the pump 69 being driven by the motor 68 with fluid being supplied from the reservoir 71 in a conventional manner with output pressure flow through a line 81 to first and second solenoid actuated control valves 82 and 84 and a line 85 through flow control valves 87 and 88. The first solenoid actuated control valve 82 is operably connected as by conduit 89 through a T-connection to the line 44 at the drive end of the cam drive assemblies 22. Both the first and second solenoid actuated control valves 82 and 84 are connected by a line 91 back to the reservoir 71. The second solenoid actuated control valve 84 is also connected as by a conduit 93 through a T-connection to the drive line 44 of the other cam drive assemblies 24.

In order to control fluid flow from the piston and cylinder assemblies 34 of the cam drive assemblies 22 and 24, the return or retract lines 45 are connected to conduits 95 and 96, respectively, through a third solenoid actuated control valve 98. The third solenoid actuator control valve 98 is connected as by a fluid pressure line 101 to the flow control valves 87 and 88 under pressure from the pump 69. Additionally, the third solenoid actuated control valve 98 is connected by a line 103 through another flow control valve 105 and a line 107 to a fluid operated timing motor 108 which returns the fluid through a conduit 109 to the reservoir 71. The flow control valve 105 is operable to regulate the quantity and pressure of fluid flow through the timing motor 108 to provide for the proper sequential operation of the cam drive assemblies 22 and 24 as will be explained. The normal or unenergized position of the first and third solenoid actuated control valves 82 and 98 are shown in FIG. 6 whereupon the first solenoid control valve 82 is operable to permit fluid flow through conduit 89 and line 91 to the reservoir 71 and the fluid under pressure through line 81 cannot flow as the spring biased vlaves close this particular fluid flow path. In regard to the third solenoid actuated valve 98 in the normal position, fluid is supplied through lines 85, 101, and the conduit 95 through line 45 to the cam drive assembly 22, and the line 45 of the other cam drive assemblies 44 are connected to conduit 96, line 103, the control valve 105, the timing motor 108, and conduit 109 to the reservoir 71.

The normal or non-energized position of the second solenoid actuated valve 84 is shown in FIG. 5 whereupon the line 44 of the cam drive assembly 24 is connected through the conduit 93 and line 91 to the reservoir 71. The fluid under pressure as supplied from the pump 69 through line 81 is sealed at the second solenoid actuated valve 84.

As shown in FIG. 5, the first and third solenoid actuated valves 82 and 98 are being energized whereas the second solenoid actuated valve 84 is in a normal condition and with this proper sequence of valve actuation, the front cam drive assemblies 22 are being supplied with a fluid through line 81 and conduit 89 to move the entire machine mechanism 10. The rear cam drive assemblies 24 are being moved to the retracted position by fluid pressure through lines 85, 101, and conduit 96 for subsequent operation. It is seen that the discharge from cam drive assemblies 22 is connected through line 45 and conduit 95 to the third solenoid actuated valve 98 to the timing motor 108 which provides an important feature of this invention as will be explained. In FIG. 6, this situation is substantially reversed whereupon the second actuator valve 84 is energized and the first and third actuator valves 82 and 98 are returned to the non-energized or normal positions to direct fluid in opposite directions to both the front and rear cam drive assemblies 22 and 24.

The electrical control means 30 of this invention, as shown in FIG. 7, includes a 220 volt power source indicated generally at 112, to drive the motor 68 for supplying power to the pump 69. A pair of fuses 114 and 115 are mounted within a line 117 and through a motor relay 118 to thereby start and stop the motor 68 as by the run and stop buttons 75 and 76, respectively. The electrical control means 30, also includes first and second time delay relays 120 and 121; the solenoids to the first, second, and third solenoid actuated valves 82, 84, and 98 are indicated at 122, 124, and 126, respectively, the same being operable to energize and move control plungers to the energized positions; and a limit switch 128 connected to the hydraulically operated timing motor 108 having an outer trip lever 129 movable from one position to another on each 180° rotation of the timing motor 108. The first and second time delay relays 120 and 121 are each provided with both instantaneous and time actuated contacts; for example the first time delay relay 120 is provided with an instantaneous, normally open contact 131; a timed delay, normally open contact 133; and a timed delay normally closed contact 134. In turn, the second time delay relay 121 is provided with an instantaneous, normally closed, contact 136; an instantaneous, normally opened, contact 137; and a timed delay, normally closed, contact 138. The first and second time delay relays 120 and 121 are of a two second time delay type but the same may be altered or adjustable as required. The limit switch 128 is operated by the hydraulic timing motor 108 to move the trip lever 129 from terminal A to terminal B as will be explained.

In use and operation of the hydraulic drive system 12 of this invention, we shall assume the position required for extending the front cam drive assemblies 22 and concurrently retracting the other or rear cam drive assemblies 24 (FIG. 5) such requiring the actuation of the first and third solenoid actuated control valves 82 and 98 with the second solenoid actuated control valve 84 being in the normally spring biased position.

In order to provide this particular fluid flow of the hydraulic drive system 12, the run push button 75 is activated which provides hydraulic pressure due to the energized motor 68 driving the pump 69. With the limit switch 128 then in a position as shown in FIG. 7, the first solenoid 122 is energized through lines 141, 142, 144, and 146, which concurrently energizes the third solenoid 126, the same controlling the respective valve components to allow fluid flow as shown in FIG. 5. Concurrently, the second solenoid 124 is connected to lines 141 and 147 to the limit switch 128 but the same is now in the open position. Also, the contact 137 of the second time delay relay 121 is in the normally open position so that energy is not supplied thereto. The first time delay relay 120 is energized through lines 141, 149 and 144 and the limit switch 128 to the line 146. This immediately closes the instantaneous contact 131 of the first time delay relay 120 which was normally open but is now closed to permit electrical current through the lines 141, 142 and 149, and 146 and the normally closed contact 138 of the second time delay relay 121. Simultaneously, energization of the first time delay relay 120 starts the time delay upon the normally open contact 133 and the normally closed contact 134, which results in the opening after two seconds of the contact 134 and the closing of contact 133.

After a predetermined delay as governed by movement of the cam drive assemblies 22 and 24 plus fluid flow through the timing motor 108, the limit switch 128 is activated to move the trip lever 129 downwardly to contact the terminal B. This immediately energizes the second solenoid 124 through lines 141, 147, and 146, and also the second time delay relay 121 through the lines 141, and 146. This immediately closes the normally open contact 137 and opens the normally closed contact 136 of the second time delay relay 121 and starts the time delay period at the normally closed contact 138. It is seen at this time that the first time delay relay 120 is still supplied with current and energized through the closed contact 138. However, after the two second time delay of the second time delay relay 121 the normally closed contact 138 opens to de-energize the first and third solenoids 122 and 126 and the first time delay relay 120. Thereupon it is seen that the first and third solenoid actuated valve members 82 and 98 are moved to the normally spring biased positions and the second solenoid actuator valve 84 is moved to the energized position that being as shown in FIG. 6. This reverses the fluid flow into the lines 44 and 45 on the cam drive assemblies 22 and 24 to retract the front cam drive assemblies 22 and to extend the rear cam drive assemblies 24 to provide the continuous drive means of the machine mechanism 10 of this invention. It is seen that for a certain time period required to open the timed contacts, the first, second, and third solenoid actuated valves 82, 84 and 98 are all energized to provide an overlapping of the extension of the front and rear cam drive assemblies 22 and 24 so that there is always a continuous pushing movement against the interconnected machine mechanism 10 to eliminate any possibility of being a jerky or shocking movement thereof.

The certain preset time period for speed of the machine mechanism 10 is controlled by the flow control valve 105 limiting fluid flow through the timing motor 108 after extending the rear cam drive assemblies 24. The trip lever 129 will open and move to terminal A to activate the first solenoid 122 and the first time delay relay 120. This results in a closing of the normally open instantaneous contact 131 of the first time delay relay 120 and starts the time cycle on the normally closed contact 134 and normally opened contact 133. It is seen that the immediate activation of the first solenoid 122 operates to provide pressure fluid flow through line 81 and conduit 95 of the front cam drive assemblies 22 to start movement in the drive condition. After the time delay has passed, the contact 134 is moved to the open position thereby deactivating the second solenoid 124 and the second time delay relay 121. The normally open contact 133 is also closed to energize the third solenoid 126 whereupon the system is returned to the status as shown in FIG. 5 providing for the extension of the front cam drive assemblies 22 and the retraction of the rear cam drive assemblies 24.

It is seen therefore that the combination of the limit switch 128 with the hydraulically driven timing motor 108 operates to move the lever 129 to control the electrical control means 30 to provide for the operation thereto. The flow control valves 87 and 88 can be regulated to achieve the desired speed of operation in supplying pressure fluid to and from the cam drive assemblies 22 and 24. It is seen that the combination of the first and second time delay relays 120 and 121 as controlled by the limit switch 128 is operable in a new and novel manner to provide an overlapping of the fluid supply to the cam drive assemblies 22 and 24 to provide for the continuous movement of the machine mechanism 10.

A selector switch 156 is provided having contacts 157, 158, 159 and 161 operable to energize the third solenoid 126 and one of the time delay relays 120, 121 in order to position in the cam drive assemblies 22 and 24 in there proper relationship if the same has been shut down for repairs, etc.

It is seen that the hydraulic drive system of this invention presents a new and novel system for continuously and evenly driving a piece of heavy equipment along a given longitudinal path and is completely self contained needing only a power source to drive the pump and provide electric current to the electrical control means. It is obvious that a plurality of cam drive assemblies can be added in series operable in a manner similar to those previously described as required depending on the given pushing power requirement considering the weight of the mechanism involved, machinery, operation, etc. It is obvious that the hydraulic drive system can be readily attached to conventional machines on the market for providing a new and novel continuous method of propelling the same.

While the invention has been described in connection with preferred specific embodiments thereof, it will be understood that this description is intended to illustrate and not to limit the scope of the invention, which is defined by the following claims.

We claim:

1. A fluid actuated drive system operable to propel a machine mechanism along a given path supported on a guide rail, comprising:
   (a) fluid actuated first and second drive means operatively connected to the guide rail and the machine mechanism movable from extended to retracted positions to provide the propelling force to said machine mechanism,
   (b) fluid control means connected to said first and second drive means including conduit means to convey fluids to and from said first and second drive means and valve means mounted in said conduit means to control direction of fluid flow and,
   (c) means for actuating said valve means operable under one set of conditions to extend said first drive means and retract said second drive means, under a second set of conditions to extend both of said first and second drive means, and under a third set of conditions to retract said first drive means and extend said second drive means.

2. A fluid actuated drive system as described in claim 1, wherein:
   (a) said first and second drive means having dual acting piston and cylinder assemblies movable under fluid pressure to extended and retracted positions, and
   (b) said fluid control means having a flow control valve and timing motor mounted in series in said conduit means connected to said valve means to receive fluid from said first and second drive means when each is in the extending positions to regulate speed of movement and actuate said valve means accordingly.

3. A fluid actuated drive system as described in claim 2, including:
   (a) said actuating means including a power source, solenoid members connected to said valve means to operate same to the various sets of conditions, switch means connected to said timing motor, relay means, and circuit means interconnecting said solenoid members, said switch means, said relay means, and said power source, and
(b) a first portion of said solenoid members and said relay means energized by said one set of conditions to extend said first drive means and retract said second drive means and to drive said timing motor, said switch means activated by said timing motor to energize a second portion of said solenoid members and said relay means to move said valve means to said second set of conditions.

4. A fluid actuated drive system as described in claim 3, wherein:
(a) said relay means having timed contacts operable to de-energize certain ones of said solenoid members to move said valve means to said third set of conditions.

5. A hydraulic drive system as described in claim 1, including:
(a) said hydraulic control means having a flow control valve and a timing motor in series in said circuit means,
(b) said actuating means including a power source, solenoid members connected to said valve means to operate same to various sets of conditions, switch means connected to said timing motors, relay means, and a circuit means interconnecting said solenoid members, said switch members, said relay means, and said power source,
(c) said valve means having first, second, and third valve members mounted in said conduit means connected to and actuated by a respective one of said solenoid members,
(d) said relay means having first and second time delay relays, each having instantaneous and delay contacts, and
(e) said limit switch connected to said circuit means in one position to energize said solenoid members on said first and third valve members and said first time delay to achieve said first set of conditions.

6. A hydraulic drive system as described in claim 5, wherein:
(a) said limit switch is movable after a preset fluid flow through said timing motor to a second position to energize said solenoid member on said second valve member and said second time delay relay,
(b) said solenoid members on said first and third valve member and said first time delay relay remains energized by one of said time contacts on said second time delay relay to achieve said second set of conditions, and
(d) said one of said time contacts on said second time delay relay opened after a given time period to de-energize said solenoid members on said first and third valve member and said first time delay relay to cause said third set of conditions.

7. A hydraulic drive system as described in claim 6, wherein:
(a) said limit switch movable from said second position to said first position to energize said solenoid member on said first valve member and said first time delay relay, and said second time delay and said solenoid member on said second valve member remains energized by one of said time contacts on said first time delay relay to cause said valve means to be in said second set of conditions, and
(b) said time contact on said first time delay relay opened after a time period to de-energize said second time delay relay and said solenoid member on said second valve member to move said valve means to said first set of conditions.

8. A hydraulic drive system as described in claim 1, wherein:
(a) said first and second drive means each having piston and cylinder assemblies connected to said machine mechanism and to a cam shoe assembly, said cam shoe assemblies connected to the guide rails when said piston and cylinder assemblies are in said extending conditions and pulled along said guide rails when in said retracted position to provide a push force to said machine mechanism relative to a stationary said cam shoe assembly.

9. A hydraulic drive system as described in claim 5, wherein:
(a) said conduit means connected to said first valve member to one end of said first drive means for supplying and receiving fluid therefrom, connected to said second valve member to one end of said second drive means to supply and receive fluid therefrom, and connected to said third valve member to the other ends of both said first and second drive means to alternately supply and receive fluid therefrom.

10. A hydraulic drive system as described in claim 9, wherein:
(a) said third valve member operable to receive fluid from said first and second drive means, respectively, being extended and deliver same to the said timing motor so as to be indicative of the speed of travel of said first and second drive means and interconnected machine mechanism.

References Cited

UNITED STATES PATENTS

| 1,843,082 | 1/1932 | Ferris et al. |
| 1,866,348 | 7/1932 | Ferris _____ 60—52 XR |
| 2,461,877 | 2/1949 | Brereton. |
| 3,120,741 | 2/1964 | Stewart. |

EDGAR W. GEOGHEGAN, *Primary Examiner.*

U.S. Cl. X.R.

60—97; 91—411; 307—88